(12) United States Patent
Park et al.

(10) Patent No.: US 9,590,446 B2
(45) Date of Patent: Mar. 7, 2017

(54) APPARATUS AND METHOD FOR WIRELESS CHARGING

(71) Applicant: Electronics and Telecommunications Research Institute, Daejeon (KR)

(72) Inventors: Ji Man Park, Daejeon (KR); Kang Bok Lee, Daejeon (KR); Kyu-Ha Baek, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 507 days.

(21) Appl. No.: 14/147,333

(22) Filed: Jan. 3, 2014

(65) Prior Publication Data

US 2014/0327390 A1    Nov. 6, 2014

(30) Foreign Application Priority Data

May 2, 2013    (KR) .................. 10-2013-0049595

(51) Int. Cl.
*H02J 7/00*    (2006.01)
*H02J 7/02*    (2016.01)

(52) U.S. Cl.
CPC .................. *H02J 7/025* (2013.01)

(58) Field of Classification Search
USPC ......................................... 320/108
See application file for complete search history.

(56) References Cited

U.S. PATENT DOCUMENTS

| 2008/0058029 A1* | 3/2008 | Sato ................... G06K 19/0702 455/573 |
| 2011/0127953 A1* | 6/2011 | Walley ............... G06K 7/10207 320/108 |
| 2013/0020988 A1* | 1/2013 | Kim ..................... H02J 7/0013 320/108 |

FOREIGN PATENT DOCUMENTS

| KR | 10-2011-0055903 A | 5/2011 |
| KR | 10-2012-0078676 A | 7/2012 |
| KR | 10-2012-0110662 A | 10/2012 |

* cited by examiner

*Primary Examiner* — Robert Grant

(57) ABSTRACT

A wireless charging apparatus is provided. The wireless charging apparatus includes: an antenna that receives electrical waves; at least two charging power generators that generate charging power for charging a battery using the electrical waves received through the antenna; and a controller that senses a frequency of the electrical waves received through the antenna and that activates one of the at least two charging power generators according to a sensed result.

18 Claims, 13 Drawing Sheets

APPARATUS AND METHOD FOR WIRELESS CHARGING

CROSS-REFERENCE TO RELATED APPLICATION

This application claims priority to and the benefit of Korean Patent Application No. 10-2013-0049595 filed in the Korean Intellectual Property Office on May 2, 2013, the entire contents of which are incorporated herein by reference.

BACKGROUND OF THE INVENTION (a) Field of the Invention

The present invention relates to a wireless charging method and an apparatus for charging a battery by wireless.

(b) Description of the Related Art

Wireless charging technology in which a user can conveniently charge many electric apparatuses such as various mobile terminals, small household goods, and toys by wireless is requested. Wireless charging technology is technology in which a radio frequency is received and in which a DC voltage that can be used in a system or a device power supply apparatus is generated. In general, a wireless charging method is classified into an induction method and a resonance method. Conventional wireless charging technology selectively uses an induction method and a resonance method. That is, a conventional receiving wireless charging apparatus that receives electrical waves uses only one of an induction method and a resonance method. The resonance method and the induction method each have merits and drawbacks. The resonance method is advantageous in view of charging distance, but has difficulty in realizing a high Q value and thus has a drawback that power transfer efficiency decreases.

The induction method generally uses the 125 KHz band, which is a low frequency band, and performs wireless charging when a distance between a receiving wireless charging apparatus and a transmitting wireless charging apparatus is very small. That is, because the induction method has a much shorter charging distance than that of the resonance method, the induction method has lower convenience, compared with a wire charging method. In a terminal (e.g., a smart phone) in which a near field communication (NFC) communication chip using a frequency band of 13.56 MHz is separately mounted, a 125 KHz antenna for wireless charging and a 13.56 MHz antenna for NFC communication should separately exist, but because of complexity and interference due to two antennas, efficiency of wireless charging may be deteriorated.

Further, there is a drawback that conventional wireless charging technology performs wireless charging using only one frequency.

SUMMARY OF THE INVENTION

The present invention has been made in an effort to provide a wireless charging method and apparatus having advantages of performing wireless charging using two or more various frequencies.

An exemplary embodiment of the present invention provides a wireless charging apparatus. The wireless charging apparatus includes: an antenna that receives electrical waves; two charging power generators that generate charging power for charging a battery using the electrical waves received through the antenna; and a controller that senses a frequency of the electrical waves received through the antenna and that activates one of the at least two charging power generators according to a sensed result.

The at least two charging power generators may include: a first charging power generator that is activated in response to a first control signal to generate the charging power; and a second charging power generator that is activated in response to a second control signal to generate the charging power, wherein the controller may activate the first control signal when a frequency of electrical waves received through the antenna corresponds to a first frequency band, and activate the second control signal when a frequency of electrical waves received through the antenna corresponds to a second frequency band lower than the first frequency band.

The first charging power generator may include: a first switch that transfers electrical waves received through the antenna, when the first control signal is activated; a first rectifier that generates DC power by rectifying the electrical waves that are transferred from the first switch; and a first converter that generates the charging power by adjusting a level of DC power that is output from the first rectifier to correspond to a capacity of the battery. The second charging power generator may include: a second switch that transfers electrical waves received through the antenna, when the second control signal is activated; a second rectifier that generates DC power by rectifying electrical waves transferred from the second switch; and a second converter that generates the charging power by adjusting a level of DC power output from the second rectifier to correspond to a capacity of the battery.

The first charging power generator may further include a third switch that transfers charging power that is output from the first converter to the battery, when a third control signal is activated, and the second charging power generator may further include a fourth switch that transfers charging power that is output from the second converter to the battery, when a fourth control signal is activated, wherein the controller may sense a charge state of the battery and activate the third control signal and the fourth control signal according to a sensed result.

The wireless charging apparatus may further include: a first impedance matching unit that performs impedance matching of electrical waves received through the antenna with a first impedance value corresponding to the first frequency band and a second impedance matching unit that performs impedance matching of electrical waves received through the antenna with a second impedance value corresponding to the second frequency band. An output of the first impedance matching unit may be transferred to the first switch, and an output of the second impedance matching unit may be transferred to the second switch.

The first impedance matching unit may be connected to a first receiving terminal and a second receiving terminal of the antenna, the second impedance matching unit may be connected to the second receiving terminal and a third receiving terminal of the antenna, and the second receiving terminal of the antenna may be formed between the first receiving terminal and the third receiving terminal.

The controller may determine, when a frequency of electrical waves received through the antenna corresponds to the first frequency band, whether the electrical waves are for NFC communication according to whether data is loaded in the electrical waves, and if the electrical waves are for the NFC communication, the controller may control to operate an NFC communication module for performing the NFC communication and inactivate the third and fourth control signals regardless of the sensed charge state of the battery.

Another embodiment of the present invention provides a wireless charging apparatus. The wireless charging apparatus includes: an antenna that receives electrical waves; an impedance matching unit that performs impedance matching of the electrical waves received through the antenna with an impedance value; a charging power generator that generates charging power for charging a battery using electrical waves output from the impedance matching unit; and a controller that senses a frequency band of the electrical waves received through the antenna and that adjusts the impedance value according to a sensed result.

The impedance matching unit may include a plurality of capacitors that are turned on/off in response to first control signals and that have capacitance corresponding to the impedance value, and the controller may generate the first control signals according to the sensed result and output the first control signals to the impedance matching unit.

Yet another embodiment of the present invention provides a wireless charging method. The wireless charging method includes: receiving electrical waves through an antenna; determining whether a frequency of the received electrical waves corresponds to one of a first frequency band and a second frequency band lower than the first frequency band; and activating, according to a determined result, one of a first charging power generator that generates charging power for charging a battery using electrical waves of the first frequency band and a second charging power generator that generates the charging power using electrical waves of the second frequency band.

DETAILED DESCRIPTION OF THE EMBODIMENTS

Figure 1A:
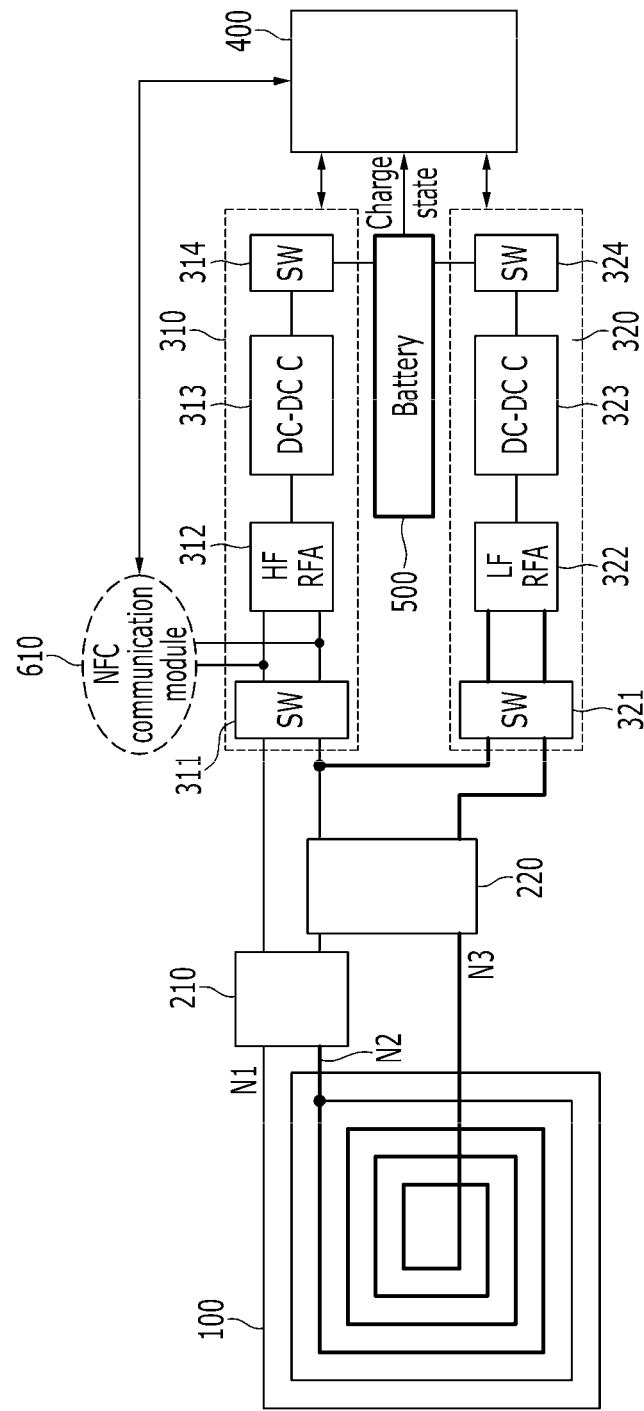
FIG. 1A is a diagram illustrating a receiving wireless charging apparatus in a terminal in which an NFC communication chip is separately mounted according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A receiving wireless charging apparatus according to an exemplary embodiment of the present invention performs wireless charging using two or more frequency bands. Hereinafter, for convenience of description, a case in which a receiving wireless charging apparatus according to an exemplary embodiment of the present invention uses two frequency bands, i.e., a frequency for NFC communication (hereinafter, an "NFC frequency") of a 13.56 MHz band, which is a high frequency, and a frequency (hereinafter, a "WPC frequency") of a 125 KHz band, which is a low frequency, is exemplified. The two frequencies (NFC frequency and WPC frequency) are currently frequently used.

Figure 1B:
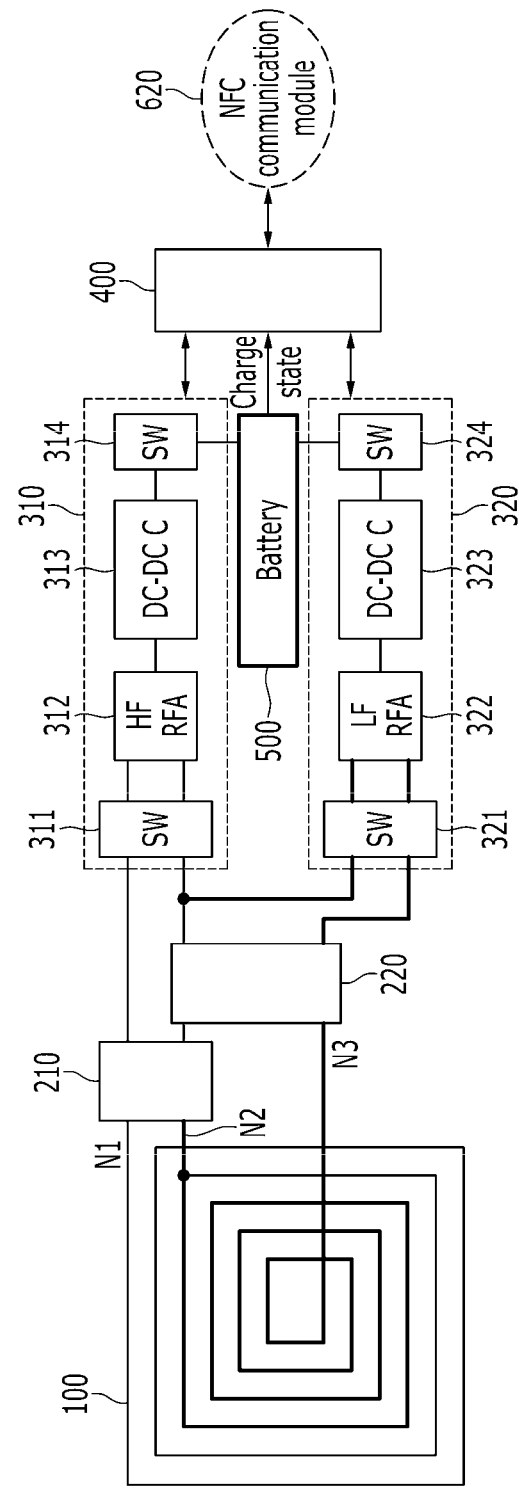
FIG. 1B is a diagram illustrating a receiving wireless charging apparatus when an NFC communication module exists within a receiving wireless charging apparatus according to an exemplary embodiment of the present invention.

FIGS. 1A and 1B illustrate a receiving wireless charging apparatus that can perform wireless charging in each of a low frequency band and a high frequency band.

FIG. 1A is a diagram illustrating a receiving wireless charging apparatus when a separate NFC communication chip for NFC communication is mounted in a terminal (e.g., a smart phone). The NFC communication chip includes an NFC communication module 610.

The receiving wireless charging apparatus includes an antenna 100, a first impedance matching unit 210, a second impedance matching unit 220, a first charging power generator 310, a second charging power generator 320, and a controller 400.

The antenna 100 receives wireless electrical waves from an outside apparatus. Here, the outside apparatus may be a transmitting wireless charging apparatus for transmitting electrical waves for wireless charging or an apparatus for transmitting electrical waves for NFC communication.

The first impedance matching unit 210 performs impedance matching of electrical waves (hereinafter, "receiving electrical waves"), having been received through the antenna 100 with a first impedance value. Here, the first impedance value is a value corresponding to an NFC frequency, which is a high frequency band and is a fixed value. The first impedance matching unit 210 is connected to receiving terminals N1 and N2 of the antenna 100. The receiving terminal N2 of the antenna 100 is a receiving terminal that is positioned between the receiving terminal N1 and a receiving terminal N3.

The second impedance matching unit 220 performs impedance matching of receiving electrical waves with a second impedance value. Here, the second impedance value is a value corresponding to a WPC frequency, which is a low frequency band and is a fixed value. The second impedance matching unit 220 is connected to the receiving terminals N2 and N3 of the antenna 100.

The first charging power generator 310 generates charging power for charging a battery 500 using received electrical waves. Specifically, the first charging power generator 310 includes a plurality of switches 311 and 314, a high frequency radio frequency analog (HF RFA) unit 312, and a DC-DC converter 313. The first charging power generator 310 is designed to generate charging power with a resonance method or an induction method.

The switch 311 transfers an output of the first impedance matching unit 210 according to a frequency band of received electrical waves to the HF RFA unit 312 and the NFC communication module 610. Specifically, when a frequency of received electrical waves corresponds to an NFC frequency band, the switch 311 is turned on to transfer an output of the first impedance matching unit 210 to the HF RFA unit 312 and the NFC communication module 610.

The HF RFA unit 312 rectifies electrical waves that are transferred from the switch 311 and generates DC power.

The DC-DC converter 313 adjusts a level of DC power that is generated by the HF RFA unit 312 to correspond to a capacity of the battery 500, and generates charging power.

The switch 314 transfers charging power that is generated by the DC-DC converter 313 to the battery 500 according to a charging state of the battery 500. Specifically, when a charge state of the battery 500 represents "charge insufficiency", the switch 314 transfers the charging power to the battery 500, and when a charge state of the battery 500 represents "full charge", the switch 314 does not transfer the charging power to the battery 500.

The second charging power generator 320 generates charging power for charging the battery 500 using received electrical waves. Specifically, the second charging power generator 320 includes a plurality of switches 321 and 324, a low frequency radio frequency analog (LF RFA) unit 322, and a DC-DC converter 323. The second charging power generator 320 generates charging power with an induction method.

The switch 321 transfers an output of the second impedance matching unit 220 to the LF RFA unit 322 according to a frequency band of received electrical waves. Specifically, when a frequency of received electrical waves corresponds to a WPC frequency band, the switch 321 is turned on to transfer an output of the second impedance matching unit 220 to the LF RFA unit 322.

The LF RFA unit 322 rectifies electrical waves that are transferred from the switch 321, and generates DC power.

The DC-DC converter 323 adjusts a level of DC power that is generated by the LF RFA unit 322 to correspond to a capacity of the battery 500, and generates charging power.

The switch 324 transfers charging power that is generated by the DC-DC converter 323 to the battery 500 according to a charge state of the battery 500. Specifically, when a charge state of the battery 500 represents "charge insufficiency", the switch 324 transfers the charging power to the battery 500, and when a charge state of the battery 500 represents "full charge", the switch 324 does not transfer the charging power to the battery 500.

The controller 400 senses a frequency of received electrical waves and activates one of the first and second charging power generators 310 and 320. That is, the controller 400 controls a charging power generator corresponding to a frequency band of received electrical waves among the first and second charging power generators 310 and 320 to generate charging power. Specifically, when a frequency band of received electrical waves corresponds to an NFC frequency band, the controller 400 turns on the switch 311 and turns off the switch 321. In contrast, when a frequency band of received electrical waves corresponds to a WPC frequency band, the controller 400 turns off the switch 311 and turns on the switch 321. The controller 400 senses a charge state of the battery 500, and when a charge state of the battery 500 represents "full charge", the controller 400 turns off the switch 314 and the switch 324. When a charge state of the battery 500 represents "charge insufficiency", the controller 400 turns on the switch 314 and the switch 324. More specifically, when a frequency of received electrical waves corresponds to an NFC frequency band and a charge state of the battery 500 represents "charge insufficiency" the controller 400 turns on the switch 314, and in other cases, the controller 400 turns off the switch 314. Similarly, when a frequency of received electrical waves corresponds to a WPC frequency band and a charge state of the battery 500 represents "charge insufficiency", the controller 400 turns on the switch 324, and in other cases, the controller 400 turns off the switch 324. When the received electrical waves correspond to an NFC frequency band, the controller 400 determines whether the received electrical waves are electrical waves for wireless charging or electrical waves for NFC communication. If the received electrical waves are electrical waves for NFC communication, the controller 400 turn off the switches 314 and 324 regardless of a charge state of a battery, and activates the NFC communication module 610 to perform NFC communication using the received electrical waves. If the received electrical waves are electrical waves for wireless charging, the controller 400 inactivates the NFC communication module 610.

FIG. 1B is a diagram illustrating a receiving wireless charging apparatus when an NFC communication module 620 exists within a receiving wireless charging apparatus according to an exemplary embodiment of the present invention. FIG. 1A illustrates a case in which an NFC communication module 610 for NFC communication is separately mounted in a terminal (e.g., a smart phone), and FIG. 1B illustrates a case in which a receiving wireless charging apparatus includes an NFC communication module 620 for NFC communication. That is, FIG. 1B illustrates a case in which an NFC service communication function is integrated with a receiving wireless charging apparatus. A terminal (e.g., a smart phone) including a receiving wireless charging apparatus of FIG. 1B does not require a separate NFC communication chip.

Figure 2:
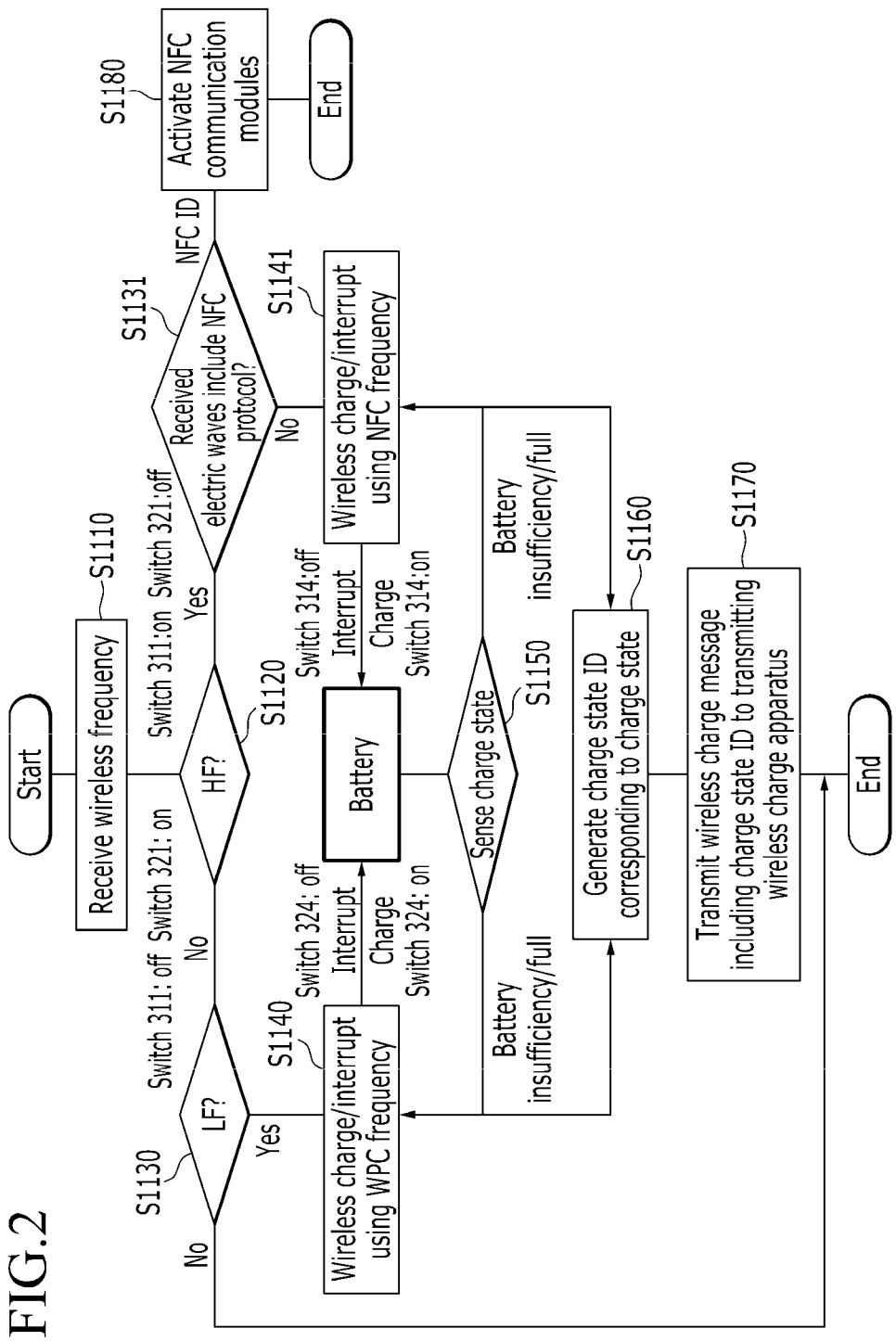
FIG. 2 is a flowchart illustrating a wireless charging process by the receiving wireless charging apparatus of FIG. 1A or 1B.

FIG. 2 is a flowchart illustrating a wireless charging process by the receiving wireless charging apparatus of FIG. 1A or 1B.

First, the receiving wireless charging apparatus receives electrical waves by wireless from a transmitting wireless charging apparatus through the antenna 100 (S1110).

When electrical waves are first input to the receiving wireless charging apparatus, the switch 311 is turned on and the switch 321 is turned off. Thereafter, the switches 311 and 321 are turned on/off according to a frequency of the received electrical waves. In contrast, when electrical waves are first input to the receiving wireless charging apparatus, the switch 311 may be turned off and the switch 321 may be turned on. Hereinafter, a case of the former is assumed and described.

The received electrical waves are transferred to the controller 400 via the turned-on switch 311 and the first charging power generator 310.

The controller 400 determines whether the received electrical waves are high frequency (HF) (S1120). Here, it is assumed that HF is electrical waves of an NFC frequency band. When the received electrical waves are HF, the controller 400 turns on the switch 311 and turns off the switch 321.

If the received electrical waves are HF, the controller 400 determines whether the received electrical waves are electrical waves for wireless charging or electrical waves for NFC communication (S1131). Specifically, if NFC communication data (data found by an NFC standard protocol) is included in the received electrical waves, the controller 400 determines that the received electrical waves are electrical waves for NFC communication, and if NFC data is not included in the received electrical waves, the controller 400 determines that the received electrical waves are electrical waves for wireless charging. If the received electrical waves are electrical waves for NFC communication, the controller 400 acquires an NFC ID from the received electrical waves and activates the NFC communication modules 610 and 620 (S1180). The activated NFC communication modules 610 and 620 perform NFC communication according to an NFC standard protocol corresponding to the acquired NFC ID. If the received electrical waves are electrical waves for wireless charging, the controller 400 converts a charging mode to a high frequency wireless charging mode. The controller 400 turns on the switch 314 to transfer charging power that is generated through the first charging power generator 310 to the battery 500. The controller 400 senses a charge state of the battery 500 (S1150), and when a charge state of the battery 500 is "charge insufficiency", the controller 400 turns on the switch 314 to continue to charge the battery 500, and when a charge state of the battery 500 is "full charge", the controller 400 turns off the switch 314 and prevents the battery 500 from being overcharged (S1141).

If the received electrical waves are not high frequency HF at step 1120, the controller 400 turns off the switch 311 and turns on the switch 321. The controller 400 determines whether received electrical waves are low frequency (LF) (S1130). Here, it is assumed that LF is electrical waves of a WPC frequency band.

If the received electrical waves are LF, the controller 400 converts a charging mode to a low frequency wireless charging mode. The controller 400 turns on the switch 324 to transfer charging power that is generated through the second charging power generator 320 to the battery 500. The controller 400 senses a charge state of the battery 500 (S1150), and when a charge state of the battery 500 is "charge insufficiency", the controller 400 turns on the switch 324 to continue to charge the battery 500, and when a charge state of the battery 500 is "full charge", the controller 400 turns off the switch 324 and prevents the battery 500 from being charged (S1140).

The controller 400 generates a charge state ID corresponding to a charge state of the battery 500 (S1160).

The receiving wireless charging apparatus transmits a wireless charging message including the charge state ID to the transmitting wireless charging apparatus (S1170). Specifically, when the received electrical waves are LF, the receiving wireless charging apparatus transmits a wireless charging message to a transmitting wireless charging apparatus according to a low frequency protocol, and when the received electrical waves are HF, the receiving wireless charging apparatus transmits a wireless charging message to a transmitting wireless charging apparatus according to a high frequency protocol. The transmitting wireless charging apparatus having received the wireless charging message adjusts power of electrical waves to correspond to the charge state ID and transmits the wireless charging message to the receiving wireless charging apparatus.

A wireless charging process of FIG. 2 may be a basic concept of wireless charging using LF and HF. However, this is just an illustration, and wireless charging can be performed with various processes according to a kind of frequency and a kind of wireless charging service.

Figure 3A:
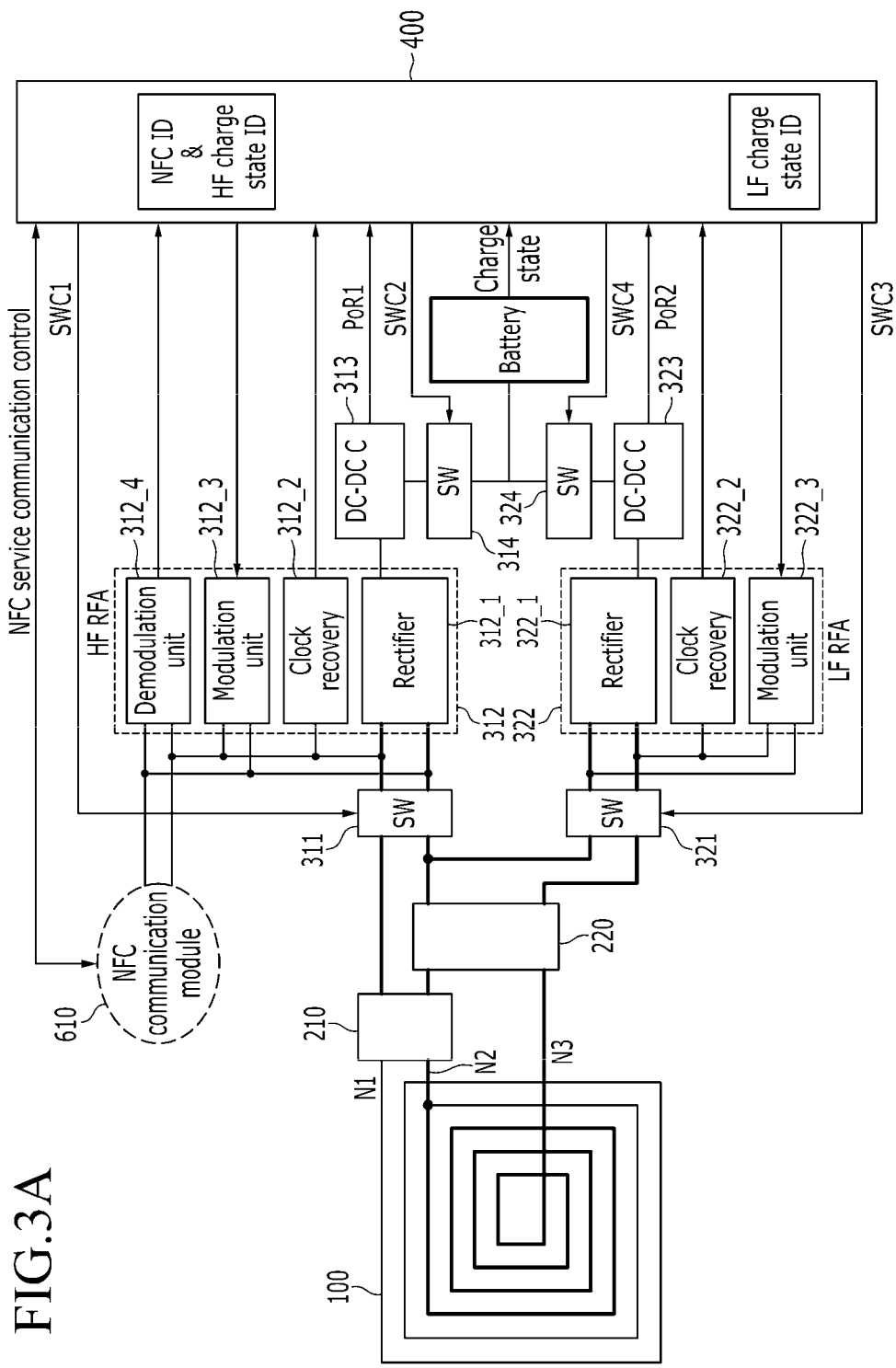
FIG. 3A is a diagram illustrating the receiving wireless charging apparatus of FIG. 1A.

FIG. 3A is a diagram illustrating a configuration of the receiving wireless charging apparatus of FIG. 1A. Hereinafter, the HF RFA unit 312, the LF RFA unit 322, and the controller 400 will be described in detail.

The HF RFA unit 312 includes a rectifier 312_1, a clock signal recovery unit 312_2, a modulation unit 312_3, and a demodulation unit 312_4.

The rectifier 312_1 rectifies received electrical waves that are transferred from the switch 311 and generates DC power. Here, a frequency of received electrical waves that are transferred from the switch 311 corresponds to a high frequency band (e.g., an NFC frequency band).

The clock signal recovery unit 312_2 recovers a clock signal of received electrical waves and outputs the clock signal to the controller 400.

The modulation unit 312_3 modulates data (e.g., HF charge state ID that is generated by the controller 400) representing a charging state to the data.

The demodulation unit 312_4 demodulates data (i.e., NFC communication data) that is loaded in received electrical waves and outputs the data to the controller 400. Specifically, the demodulation unit 312_4 may be an amplitude shift keying (ASK) demodulation unit.

The LF RFA unit 322 includes a rectifier 322_1, a clock signal recovery unit 322_2, and a modulation unit 322_3. The LF RFA unit 322 and the HF RFA unit 312 are the same in constituent elements 312_1, 312_2, 312_3, 322_1, 322_2, and 322_3, except for the demodulation unit 312_4. However, because frequency bands of electrical waves that are input to each of the LF RFA unit 322 and the HF RFA unit 312 are different, characteristics of each of constituent elements 312_1, 312_2, 312_3, 322_1, 322_2, and 322_3 are different.

The rectifier 322_1 rectifies received electrical waves that are transferred from the switch 321 and generates DC power. Here, a frequency of received electrical waves that are transferred from the switch 321 corresponds to a low frequency band (e.g., a WPC frequency band).

The clock signal recovery unit 322_2 recovers a clock signal of received electrical waves that are transferred from the switch 321 and outputs the clock signal to the controller 400.

In order to transmit data (e.g., LF charge state ID that is generated by the controller 400) representing a charge state to the transmitting wireless charging apparatus, the modulation unit 322_3 modulates the data.

When a frequency of received electrical waves corresponds to an NFC frequency band, the controller 400 transfers an activated control signal SWC1 to the switch 311 and turns on the switch 311, and when a frequency of received electrical waves corresponds to a WPC frequency band, the controller 400 transfers an activated control signal SWC3 to the switch 321 and turns on the switch 321. When a charge state of the battery 500 represents "charge insufficiency", the control signals SWC2 and SWC4 that are generated by the controller 400 are activated, and when a charge state of the battery 500 represents "full charge", the control signals SWC2 and SWC4 that are generated by the controller 400 are inactivated. When the activated control signal SWC2 is transmitted to the switch 314, the switch 314 is turned on, and when the activated control signal SWC4 is transmitted to the switch 324, the switch 324 is turned on. When the received electrical waves are electrical waves for NFC communication, the controller 400 inactivates the control signals SWC2 and SWC4 regardless of a charge state of the battery 500.

The controller 400 acquires NFC ID from demodulated NFC communication data and controls the NFC communication module 610 for NFC service communication. Specifically, when the received electrical waves are electrical waves for NFC communication, the controller 400 generates a control signal (not shown) that activates the NFC communication module 610, and transmits the control signal to the NFC communication module 610.

The controller 400 is activated in response to a power on reset (PoR). Specifically, when charging power is generated by the DC-DC converter 313, the reset signal PoR1 is activated, and when charging power is generated by the DC-DC converter 323, a reset signal PoR2 is activated. The controller 400 is activated in response to the activated reset signals PoR1 and PoR2 and performs the above-described control operation.

Figure 3B:
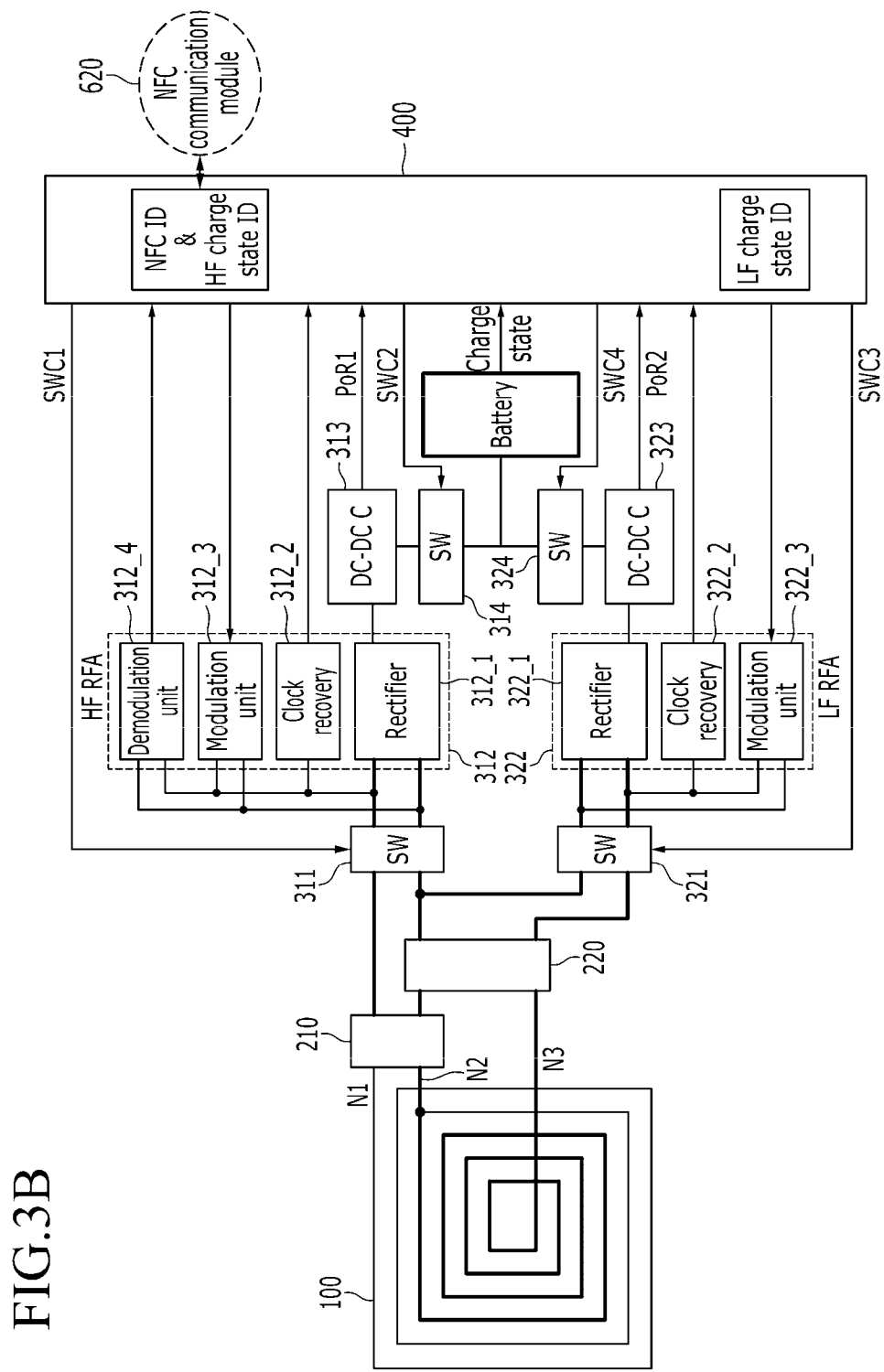
FIG. 3B is a diagram illustrating the receiving wireless charging apparatus of FIG. 1B.

FIG. 3B is a diagram illustrating the receiving wireless charging apparatus of FIG. 1B. As described above, FIG. 3B is different from FIG. 3A in that the NFC communication module 620 for performing NFC service communication is included in the receiving wireless charging apparatus. Therefore, because a separate NFC communication chip is not required, NFC service communication can be easily performed with only a terminal (e.g., a smart phone) including a receiving wireless charging apparatus according to the present invention.

The receiving wireless charging apparatus may further include an RF limiter (not shown) for protecting a circuit from a voltage that is instantaneously increased to a threshold level or more between the switch 311 and the HF RFA unit 312. Further, the receiving wireless charging apparatus may further include an RF limiter (not shown) for protecting a circuit from a voltage that is instantaneously increased to a threshold level or more between the switch 321 and the LF RFA unit 322. The DC-DC converters 313 and 323 may further include an over-voltage protection (OVP) circuit for an overvoltage of a threshold level or more.

The receiving wireless charging apparatus of FIG. 3A (or 3B) that integrates NFC communication technology, high frequency wireless charging technology, and low frequency wireless charging technology may be formed with one or more chips.

Figure 3C:
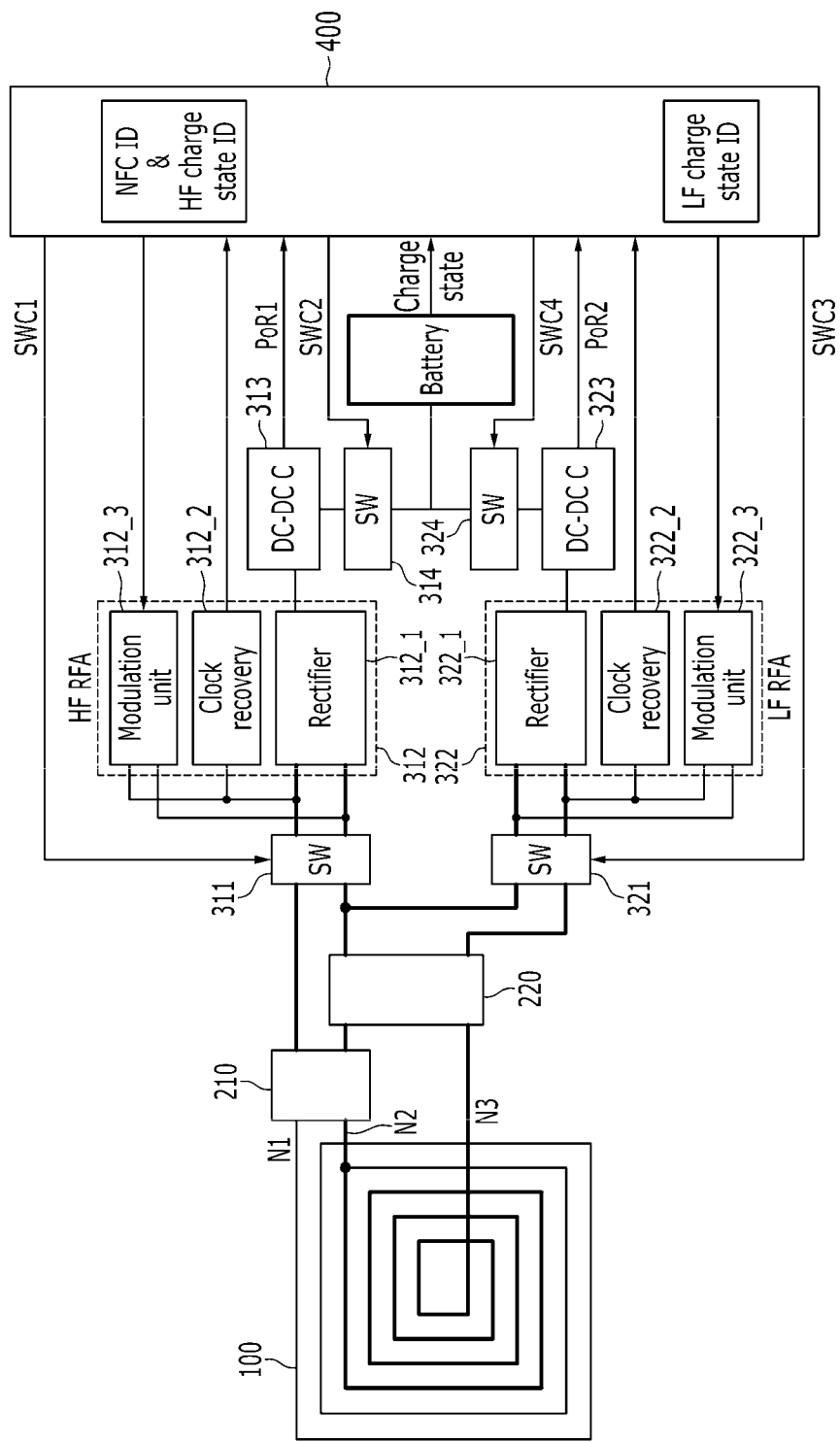
FIG. 3C is a diagram illustrating a receiving wireless charging apparatus in a terminal having no NFC communication function according to an exemplary embodiment of the present invention.

FIG. 3C is a diagram illustrating a receiving wireless charging apparatus in a terminal having no NFC communication function according to an exemplary embodiment of the present invention. In a terminal that does not provide an NFC service communication function, a receiving wireless charging apparatus that is embodied like FIG. 3C may be applied to the terminal. The wireless charging apparatus of FIG. 3C is different from that of FIG. 3A in that the wireless charging apparatus of FIG. 3C does not include the demodulation unit 312_4. It is characterized in that the wireless charging apparatus of FIG. 3C basically performs wireless charging in two frequency domains. The wireless charging apparatus of FIG. 3C that integrates high frequency wireless charging technology and low frequency wireless charging technology may be formed with one or more chips.

Figure 4:
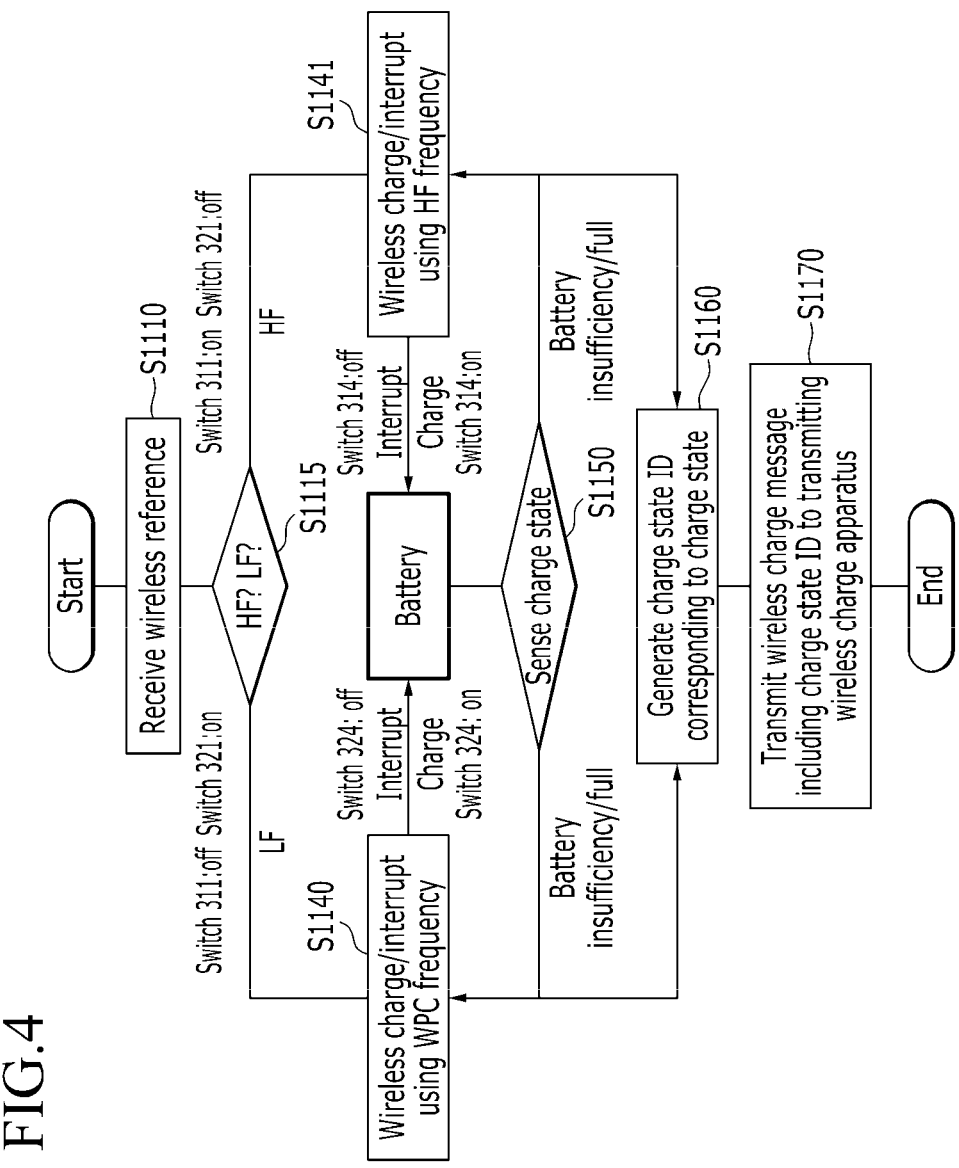
FIG. 4 is a flowchart illustrating a wireless charging process of the wireless charging apparatus of FIG. 3C.

FIG. 4 is a flowchart illustrating a wireless charging process of the wireless charging apparatus of FIG. 3C. The wireless charging process of FIG. 4 is the same as the remaining processes, except for an i) step of determining whether received electrical waves are electrical waves for NFC communication (S1131), and ii) if received electrical waves are electrical waves for NFC communication, a step of controlling an NFC communication module (S1180) in a wireless charging process of FIG. 2. The step of determining of whether received electrical waves are HF or LF (S1115) corresponds to steps S1120 and S1130 of FIG. 2.

Figure 5:
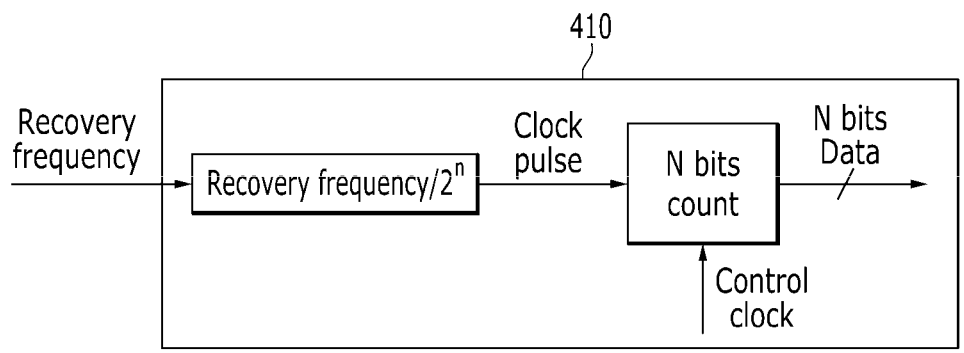
FIG. 5 is a diagram illustrating a frequency determination module that determines a frequency band of received electrical waves.

FIG. 5 is a diagram illustrating a frequency determination module 410 that determines a frequency band of received electrical waves.

The controller 400 further includes a frequency determination module 410.

Received electrical waves having a clock signal that is recovered through clock signal recovery units 312_2 and 322_2 are input to the frequency determination module 410. The frequency determination module 410 divides a frequency (restoration frequency) of the input received electrical waves into a predetermined size ($2^n$) in order to distinguish a frequency, and counts a pulse width of the divided frequency with a control clock, which is a fast clock. For example, when the frequency determination module 410 is set to divide a frequency by $\frac{1}{2}^2$ times, and when a frequency (recovery frequency) of the input received electrical waves is 13.56 MHz, the frequency determination module 410 counts a pulse width of the divided frequency 3.39 MHz with a control clock. The frequency determination module 410 determines a frequency of the received electrical waves through a counted value (N bits data). That is, the frequency determination module 410 determines whether the received electrical waves are high frequency, low frequency, electrical waves for wireless charging, or other electrical waves through the counted value (N bits Data).

Figure 6A:
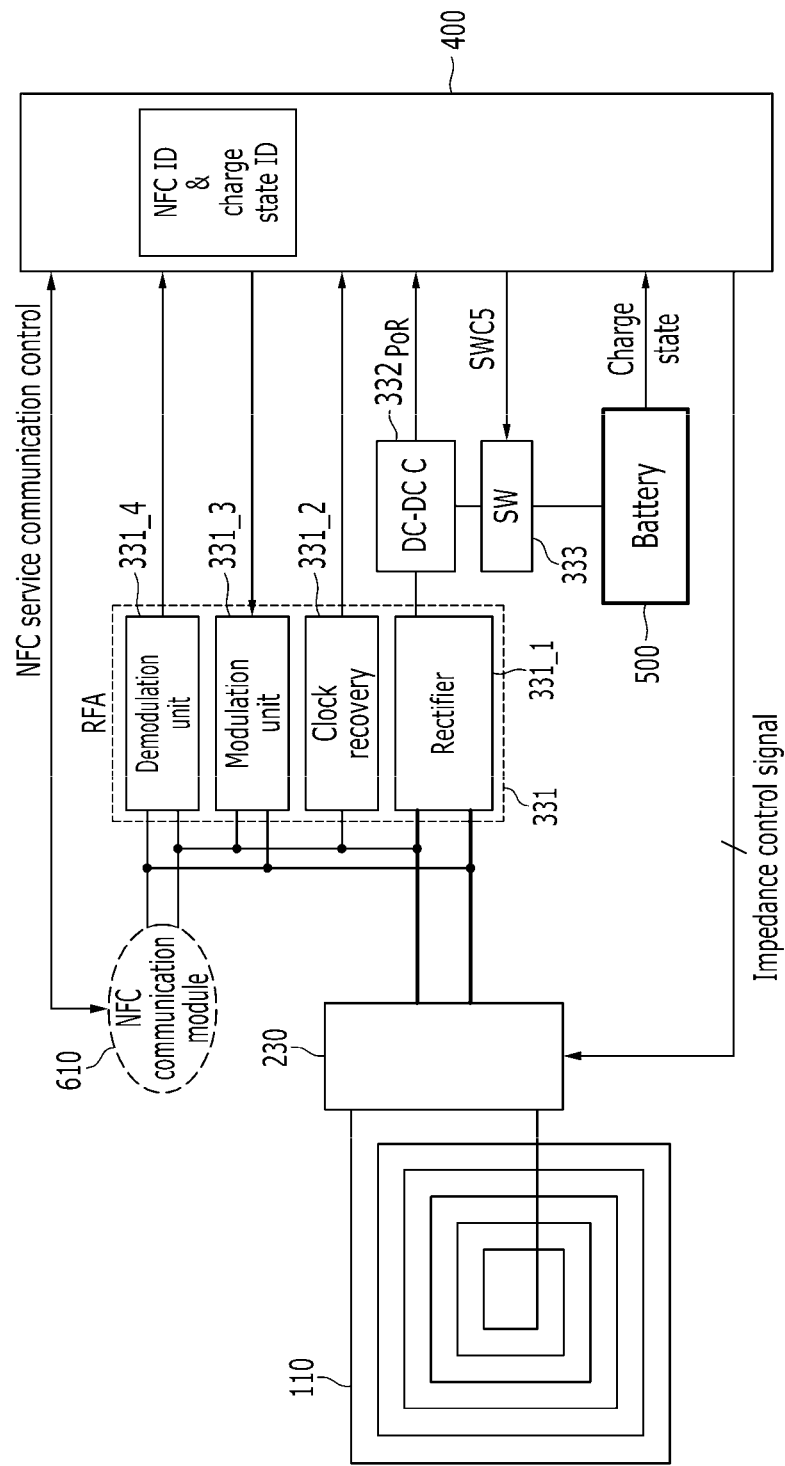
FIGS. 6A, 6B, and 6C are diagrams illustrating a receiving wireless charging apparatus including an impedance matching unit in which an impedance value is adjusted according to a frequency band according to another exemplary embodiment of the present invention.
Figure 6B:
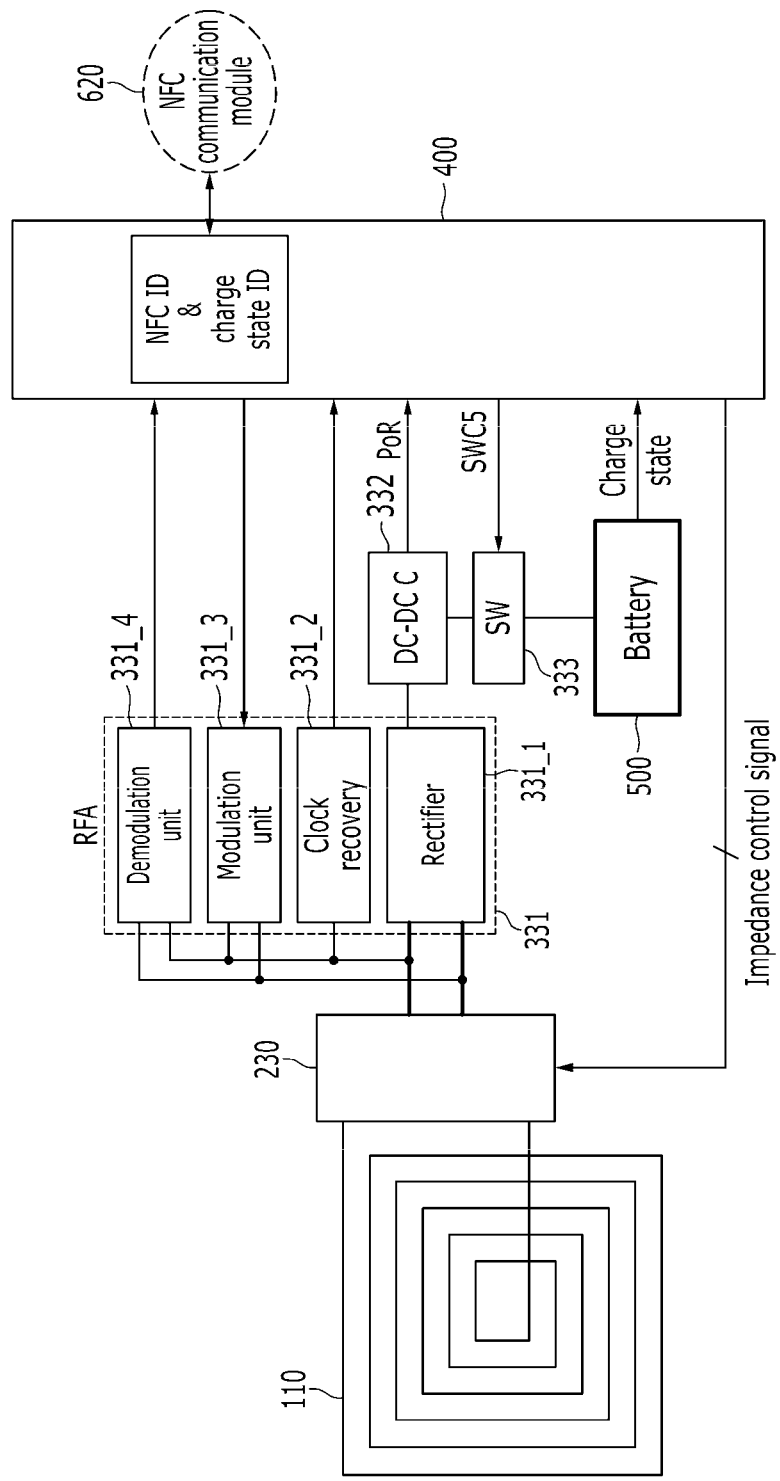
Figure 6C:
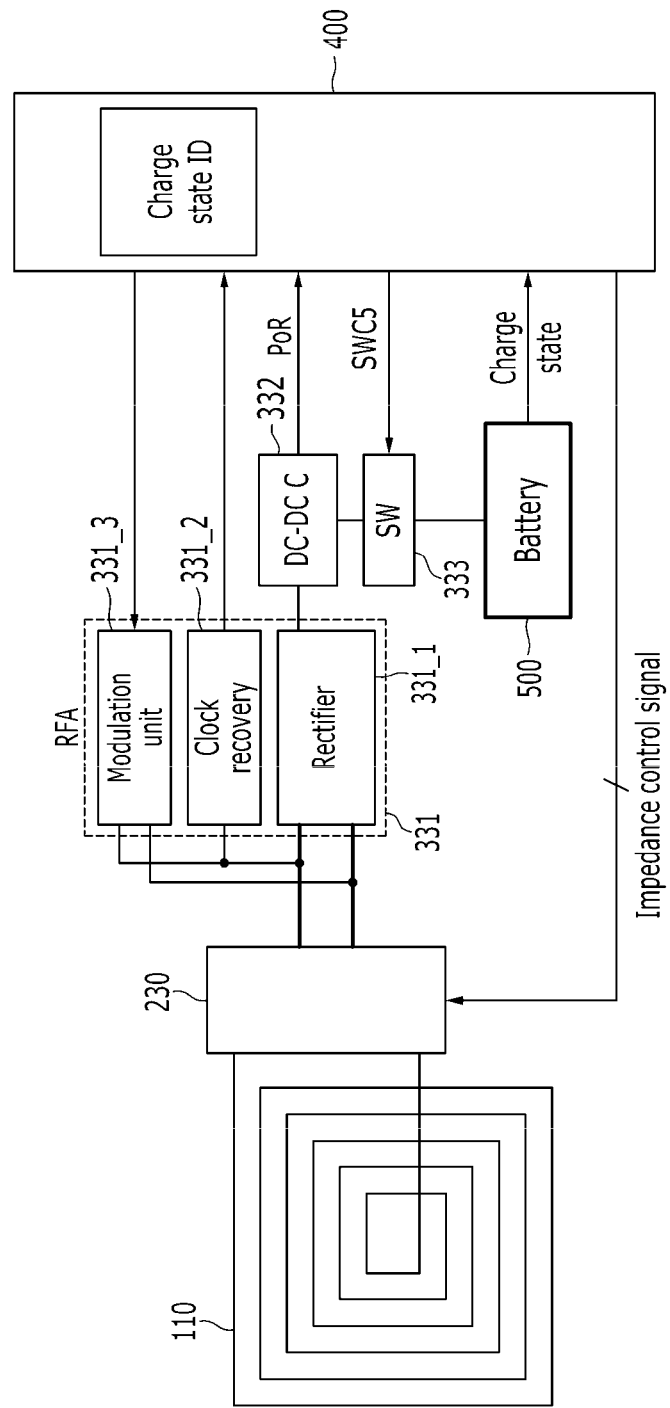

FIGS. 6A, 6B, and 6C are diagrams illustrating a receiving wireless charging apparatus including an impedance matching unit in which an impedance value is adjusted according to a frequency band. Specifically, FIG. 6A illustrates a receiving wireless charging apparatus in a terminal (e.g. a smart phone) in which a separate NFC communication chip 610 is mounted. FIG. 6B illustrates a receiving wireless charging apparatus when an NFC communication module 620 exists within a receiving wireless charging apparatus. FIG. 6C illustrates a receiving wireless charging apparatus in a terminal having no NFC communication function.

The receiving wireless charging apparatus of FIGS. 6A, 6B, and 6C integrates constituent elements having a similar function to that in FIGS. 3A, 3B, and 3C, and includes an impedance matching unit 230 that adjusts an impedance value according to a frequency of received electrical waves. That is, the first and second impedance matching units 210 and 220 in FIGS. 3A, 3B, and 3C perform impedance matching with a fixed impedance value, but the impedance matching unit 230 of FIGS. 6A, 6B, and 6C adjusts an impedance value according to a frequency of received electrical waves. As the receiving wireless charging apparatus of FIGS. 6A, 6B, and 6C controls the impedance matching unit 230 according to a frequency of received electrical waves, the receiving wireless charging apparatus can perform wireless charging for various frequencies of hundreds of kilohertz to hundreds of megahertz. Hereinafter, the receiving wireless charging apparatus of FIGS. 6A, 6B, and 6C will be described based on differences from FIGS. 3A, 3B, and 3C.

The receiving wireless charging apparatus includes an antenna 110, an impedance matching unit 230, an RFA unit 331, a DC-DC converter 332, a switch 333, and a controller 400.

The antenna 110 receives electrical waves from a transmitting wireless charging apparatus.

The impedance matching unit 230 adjusts an impedance value according to a frequency of received electrical waves so that a frequency of the received electrical waves may become a resonant frequency, and performs impedance matching of received electrical waves with the adjusted impedance value. Specifically, an impedance value of the impedance matching unit 230 is adjusted in response to an impedance control signal. The impedance matching unit 230 will be described in detail with reference to FIGS. 7A and 7B.

The RFA unit 331 includes a rectifier 331_1, a clock signal recovery unit 331_2, a modulation unit 331_3, and a demodulation unit 331_4. A configuration of the RFA unit 331 is the same as that of the HF RFA unit 312 of FIG. 3A. However, because frequencies of electric waves that are input to each of the RFA unit 331 and the HF RFA unit 312 are different, characteristics of each element may be different.

The DC-DC converter 332 performs a similar function to that of the DC-DC converter 313 of FIG. 3A.

The switch 333 performs a similar function to that of the switch 314 of FIG. 3A. When a control signal SWC5 is activated, the switch 333 is turned on, and when the control signal SWC5 is inactivated, the switch 333 is turned off.

A difference between the controller 400 and the controller 400 of FIG. 3A is that it senses a frequency band of received electrical waves and adjusts an impedance value of the impedance matching unit 230 according to a sensed result. Specifically, when a frequency of received electrical waves corresponds to an NFC frequency band, the controller 400 adjusts an impedance value of the impedance matching unit 230 to a value of the first level, and when a frequency of received electrical waves corresponds to a WPC frequency band, the controller 400 adjusts an impedance value of the impedance matching unit 230 to a value of the second level. The controller 400 generates an impedance control signal for adjusting an impedance value of the impedance matching unit 230. When a charge state of the battery 500 represents "charge insufficiency", the controller 400 activates a control signal SWC5, and when a charge state of the battery 500 represents "full charge", the controller 400 inactivates the control signal SWC5. When received electrical waves are electrical waves for NFC communication, the controller 400 inactivates the control signal SWC5 regardless of a charge state of the battery 500.

Figure 7A:
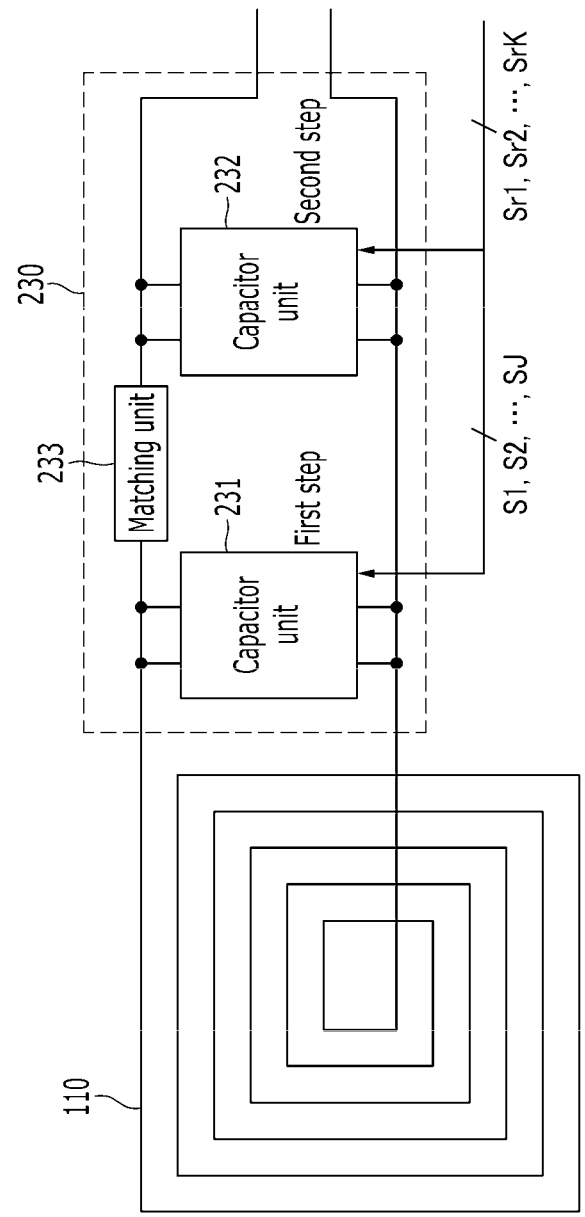
FIG. 7A is a diagram illustrating an impedance matching unit of FIG. 6A.

FIG. 7A is a diagram illustrating the impedance matching unit 230 of FIG. 6A.

The impedance matching unit 230 includes at least one of capacitor units 231 and 232 and a micro-matching unit 233. For convenience of description, FIG. 7A illustrates a case in which the impedance matching unit 230 includes two capacitor units 231 and 232. An impedance value of the impedance matching unit 230 may be adjusted to a micro-range through the two capacitors 231 and 232.

The capacitor unit 231 includes a plurality of capacitors. The capacitor unit 231 is entirely coupled in parallel to the antenna 110, but capacitors of the capacitor unit 231 may be coupled in series or in parallel. When capacitance of the capacitor unit 231 is adjusted, an impedance value of the impedance matching unit 230 is relatively greatly changed, compared with when capacitance of the capacitor unit 232 is adjusted. Specifically, capacitance of the capacitor unit 231 is adjusted through impedance control signals (S1-SJ, where J is a natural number) that are transferred from the controller 400.

The capacitor unit 232 includes a plurality of capacitors. The capacitor unit 232 is entirely coupled in parallel to the antenna 110, but capacitors of the capacitor unit 232 may be coupled in series or in parallel. When capacitance of the capacitor unit 232 is adjusted, an impedance value of the impedance matching unit 230 is relatively little changed, compared with when capacitance of the capacitor unit 231 is adjusted. Specifically, capacitance of the capacitor unit 232 is adjusted through impedance control signals (Sr1-SrK, where K is a natural number) that are transferred from the controller 400.

The micro-matching unit 233 is an element for increasing efficiency of wireless charging of received electrical waves, and is used for more minute impedance matching. The impedance matching unit 230 may be formed without the micro-matching unit 233.

Figure 7B:
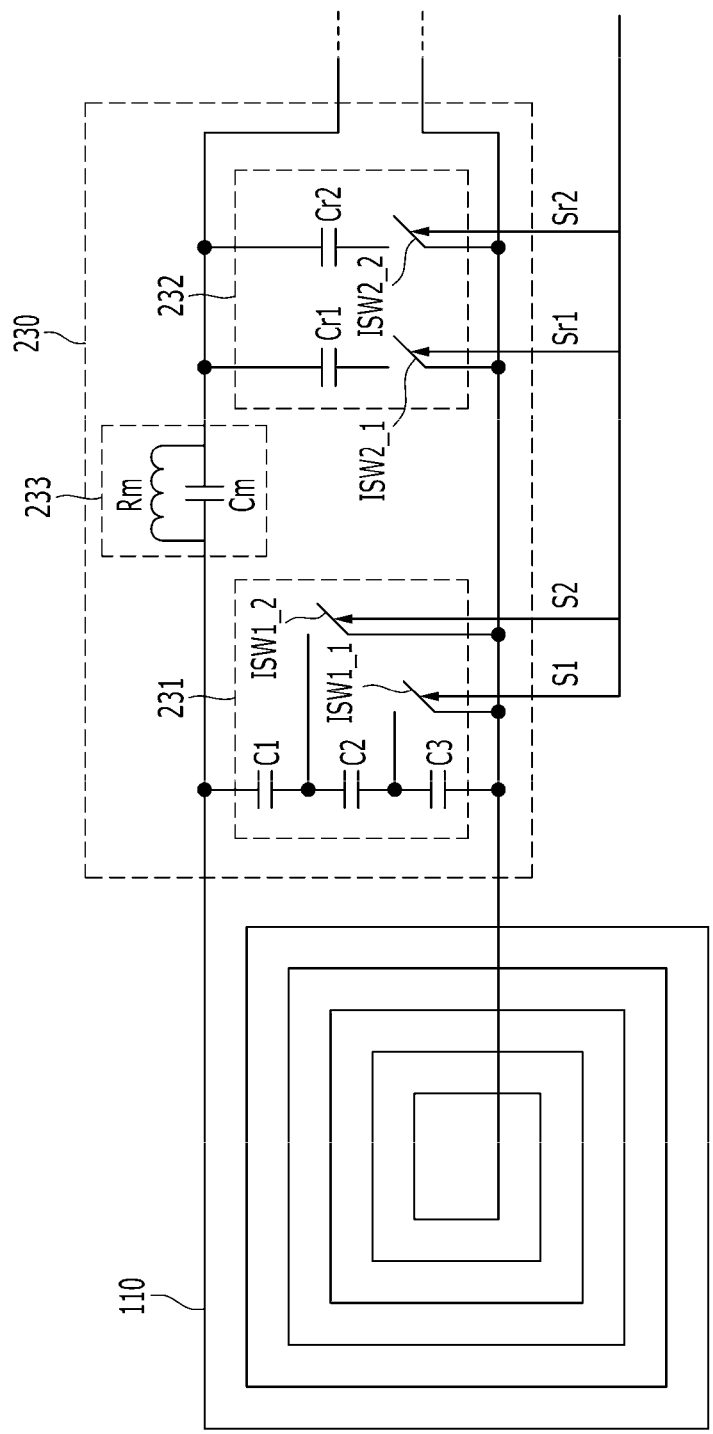
FIG. 7B is a diagram illustrating a configuration of the impedance matching unit of FIG. 7A.

FIG. 7B is a diagram illustrating constituent elements 231, 232, and 233 of the impedance matching unit 230 of FIG. 7A.

Specifically, FIG. 7B illustrates a case in which the capacitor unit 231 includes three capacitors C1-C3 and two switches ISW1_1 and ISW1_2, and in which the three capacitors C1-C3 are coupled in series. The switch ISW1_1 is turned on/off in response to an impedance control signal S1, and the switch ISW1_2 is turned on/off in response to an impedance control signal S2.

Specifically, FIG. 7B illustrates a case in which the capacitor unit 232 includes two capacitors Cr1 and Cr2 and two switches ISW2_1 and ISW2_2, and in which the two capacitors Cr1 and Cr2 are coupled in parallel. The switch ISW2_1 is turned on/off in response to an impedance control signal Sr1, and the switch ISW2_2 is turned on/off in response to an impedance control signal Sr2.

The micro-matching unit 233 includes a capacitor Cm and an inductor Rm that are coupled in parallel. Unlike the case of FIG. 7B, the micro-matching unit 233 may include only one capacitor Cm or only one inductor Rm.

As shown in FIG. 7B, the receiving wireless charging apparatus adjusts capacitance of the plurality of capacitors C1-C3 and Cr1-Cr2 that are coupled in series/in parallel through impedance control signals S1, S2, Sr1, and Sr2. Thereby, even when the receiving wireless charging apparatus uses only the fixed one antenna 110, impedance matching may be performed according to a frequency of received electrical waves.

A receiving wireless charging apparatus according to an exemplary embodiment of the present invention may be designed to perform low frequency wireless charging at frequency bands of hundreds of kilohertz with an induction method, and to perform high frequency wireless charging at frequency bands of several to tens of megahertz with an induction method or a resonance method. Thereby, convenience and efficiency of wireless charging can be improved.

According to an exemplary embodiment of the present invention, a receiving wireless charging apparatus that integrates wireless charging technology using a high frequency, wireless charging technology using a low frequency, and NFC communication technology is provided. Thereby, convenience and efficiency of wireless charging can be improved. Further, when integrating the technologies, constituent elements that can be commonly use are integrated, and a switch (e.g. 311, 314, 321, and 324) and an impedance control function are added. By integration of such constituent elements, the receiving wireless charging apparatus can be formed in a small size.

In the foregoing description, a receiving wireless charging apparatus using an NFC frequency, which is a high frequency, and a WPC frequency, which is a low frequency, has been exemplified, but this just an illustration. The receiving wireless charging apparatus according to the present invention can be applied to various frequency bands in addition to the stated frequencies (NFC frequency, WPC frequency). Further, the receiving wireless charging apparatus according to the present invention can be applied to three or more frequency bands in addition to the two frequency bands.

The present invention performs wireless charging using various radio frequencies. Further, the present invention can control NFC service communication and wireless charging together. Thereby, convenience and efficiency of wireless charging can be improved.

In addition, by maximally integrating elements that can be commonly used in various frequencies, a wireless charging apparatus can be formed with a small size.

The present invention also performs impedance matching according to a frequency band so that a wireless charging frequency that is input to a wireless charging apparatus may become a resonant frequency. Thereby, efficiency of wireless charging can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wireless charging apparatus, comprising:
   an antenna that receives electrical waves;
   a first charging power generator including a first switch that connects the first charging power generator to the antenna in response to a first control signal, the first charging power generator generating charging power for charging a battery using the electrical waves received by the antenna;
   a second charging power generator including a second switch that connects the second charging power generator to the antenna in response to a second control signal, the second charging power generator generating charging power for charging the battery using the electrical waves received through the antenna; and
   a controller that senses a frequency of the electrical waves received through the antenna, activates the first control signal when the sensed frequency corresponds to a first frequency band, and activates the second control signal when the sensed frequency corresponds to a second frequency band lower than the first frequency band.

2. The wireless charging apparatus of claim 1, wherein the first charging power generator further comprises:
   a first rectifier coupled between the first switch and the battery, the first rectifier generating DC power by rectifying the electrical waves from the antenna; and
   a first converter that generates the charging power by adjusting a level of the DC power that is output from the first rectifier to correspond to a capacity of the battery, and
   wherein the second charging power generator further comprises:
   a second rectifier coupled between the second switch and the battery, the second rectifier generating DC power by rectifying the electrical waves from the antenna; and
   a second converter that generates the charging power by adjusting a level of the DC power output from the second rectifier to correspond to the capacity of the battery.

3. The wireless charging apparatus of claim 2, wherein the first charging power generator further comprises a third switch that transfers the charging power that is output from the first converter to the battery, when a third control signal is activated, and
the second charging power generator further comprises a fourth switch that transfers the charging power that is output from the second converter to the battery, when a fourth control signal is activated,
wherein the controller senses a charge state of the battery and activates the third control signal and the fourth control signal according to a sensed result.

4. The wireless charging apparatus of claim 3, further comprising:
   a first impedance matching unit that performs impedance matching of the electrical waves received through the antenna with a first impedance value corresponding to the first frequency band; and
   a second impedance matching unit that performs impedance matching of the electrical waves received through the antenna with a second impedance value corresponding to the second frequency band,
   wherein an output of the first impedance matching unit is transferred to the first switch, and
   an output of the second impedance matching unit is transferred to the second switch.

5. The wireless charging apparatus of claim 4, wherein the first impedance matching unit is connected to a first receiving terminal and a second receiving terminal of the antenna,
   the second impedance matching unit is connected to the second receiving terminal and a third receiving terminal of the antenna, and
   the second receiving terminal of the antenna is disposed between the first receiving terminal and the third receiving terminal.

6. The wireless charging apparatus of claim 3, wherein the controller transmits data representing the sensed charge state of the battery to an external transmitting apparatus having transmitted the electrical waves.

7. The wireless charging apparatus of claim 5, wherein the first frequency band is a frequency band for near field communication (NFC) communication, and
   the controller determines, when the frequency of the electrical waves received through the antenna corresponds to the first frequency band, whether the electrical waves are for the NFC communication according to whether data is loaded in the electrical waves, and if the electrical waves are for the NFC communication, the controller controls an NFC communication module to perform the NFC communication, and inactivates the third and fourth control signals regardless of the sensed charge state of the battery.

8. The wireless charging apparatus of claim 7, wherein the NFC communication module is positioned within the wireless charging apparatus.

9. The wireless charging apparatus of claim 7, wherein the first and second charging power generators each comprise:
   a clock signal recovery unit that recovers a clock signal of the electrical waves received through the antenna and that outputs the clock signal to the controller; and
   a modulation unit that modulates data representing the charge state of the battery that is sensed by the controller, and
   wherein the first charging power generator further comprises a demodulation unit that demodulates data that is loaded in the electrical waves received through the antenna, and that outputs the data to the controller.

10. The wireless charging apparatus of claim 9, wherein the controller comprises a frequency determination unit that divides the frequency of electrical waves having the clock signal that is recovered by the clock signal recovery unit into a predetermined size, that counts a pulse width of the divided frequency with a reference clock signal, and that determines the frequency of the electrical waves received through the antenna using the counted value.

11. The wireless charging apparatus of claim 1, wherein the first charging power generator generates the charging power with a resonant method, and
wherein the second charging power generator generates the charging power with a magnetic induction method.

12. The wireless charging apparatus of claim 2, further comprising a limiter that protects a circuit from an overvoltage between the first rectifier and the first switch.

13. The wireless charging apparatus of claim 2, wherein the first converter further comprises an over voltage protection (OVP) circuit.

14. A wireless charging apparatus, comprising:
an antenna that receives electrical waves;
an impedance matching unit comprising a plurality of capacitors activated by a plurality of first control signals, the impedance matching unit performing impedance matching of the electrical waves received through the antenna with an impedance value generated by the plurality of capacitors;
a charging power generator that generates charging power for charging a battery using electrical waves output from the impedance matching unit; and
a controller that senses a frequency band of the electrical waves received through the antenna generates the plurality of first control signals according to the sensed frequency band, and outputs the plurality of first control signals to the impedance matching unit.

15. The wireless charging apparatus of claim 14, wherein the charging power generator comprises:
a rectifier that generates DC power by rectifying the electrical waves that are output from the impedance matching unit;
a converter that generates the charging power by adjusting a level of the DC power that is output from the rectifier to correspond to a capacity of the battery; and
a switch that transfers the charging power output from the converter to the battery when a second control signal is activated,
wherein the controller senses a charge state of the battery and activates the second control signal according to the sensed charge state.

16. The wireless charging apparatus of claim 15, further comprising a near field communication (NFC) module that is activated in response to a third control signal to perform NFC communication,
wherein, when a frequency of the electrical waves received through the antenna corresponds to a frequency band for the NFC communication, the controller determines whether the electrical waves are for the NFC communication according to whether data is loaded in the electrical waves, and
wherein, when the electrical waves are for the NFC communication, the controller activates the third control signal and inactivates the second control signal regardless of the sensed charge state of the battery.

17. The wireless charging apparatus of claim 16, wherein the charging power generator further comprises:
a clock signal recovery unit that recovers a clock signal of the electrical waves received through the antenna and that outputs the clock signal to the controller;
a modulation unit that modulates data representing the charge state of the battery that is sensed by the controller; and
a demodulation unit that demodulates data that is loaded in the electrical waves received through the antenna and that outputs the data to the controller.

18. A wireless charging method, comprising:
receiving electrical waves through an antenna;
determining whether a frequency of the received electrical waves corresponds to one of a first frequency band and a second frequency band lower than the first frequency band;
activating, by a controller, a first control signal when the frequency corresponds to the first frequency band and a second control signal when the frequency corresponds to the second frequency band; and
charging a battery with the electrical waves, by a first charging power generator, by activating a first switch in response to the first control signal;
charging the battery with the electrical waves, by a second charging power generator, by activating a second switch in response to the second control signal.

* * * * *